(12) United States Patent
Malarky (10) Patent No.: US 6,249,513 B1
(45) Date of Patent: Jun. 19, 2001

(54) MANAGING INTER-SATELLITE CONNECTIONS IN A CONSTELLATION WITH OVERLAPPING ORBITAL PLANES

(75) Inventor: Alastair Malarky, Lafayette, CO (US)

(73) Assignee: COM DEV Limited, Cambridge (CA)

(*) Notice: Subject to any disclaimer, the term of this patent is extended or adjusted under 35 U.S.C. 154(b) by 0 days.

(21) Appl. No.: 09/019,904

(22) Filed: Feb. 6, 1998

(51) Int. Cl.$^7$ .................................................. H04B 7/185
(52) U.S. Cl. ............................................................ 370/316
(58) Field of Search .................................... 370/316, 317, 370/318; 455/13.1; 701/226, 224; 342/357, 356, 357.06

(56) References Cited

U.S. PATENT DOCUMENTS

| | | |
|---|---|---|
| 5,415,368 | 5/1995 | Horstein et al. . |
| 5,430,729 | 7/1995 | Rahnema . |
| 5,433,726 | 7/1995 | Horstein et al. . |
| 5,439,190 | 8/1995 | Horstein et al. . |
| 5,448,623 | 9/1995 | Wiedeman et al. . |
| 5,471,641 | * 11/1995 | Dosiere et al. ............... 455/13.1 |
| 5,523,997 | 6/1996 | Bishop, Jr. . |
| 5,537,679 | 7/1996 | Crosbie et al. . |
| 5,551,624 | 9/1996 | Horstein et al. . |
| 5,596,722 | 1/1997 | Rahnema . |
| 5,634,190 | 5/1997 | Wiedeman . |
| 5,678,175 | 10/1997 | Stuart et al. . |
| 5,751,246 | * 5/1998 | Hertel ................................. 342/357 |
| 5,979,830 | * 11/1999 | Kellermeier ..................... 244/158 R |

OTHER PUBLICATIONS

"Iridium*: Key to Worldwide Cellular Communications", Foley, Jim, Telecommunications, Oct. 1991.
"Solid–State Laser Cross–Link Systems And Technology", Begley, D.L., Kobylinski, R.A. and Ross, M., International Journal of Satellite Communications.
"Circular Polar Constellations Providing Continuous Single Or Multiple Coverage Above A Specified Latitude", Adams, W.S. and Rider, L., The Journal of the Astronautical Sciences, vol. 35, No. 2, Apr.–Jun. 1987, pp. 155–192.
"Sony Laser Beam Link System Offers Integrated Optical Space Transmission", Otobe, Takashi.

* cited by examiner

Primary Examiner—Huy D. Vu
Assistant Examiner—Alexander Boakye
(74) Attorney, Agent, or Firm—Jones, Day, Reavis & Pogue (57) ABSTRACT

A system and method for managing inter-satellite connectivity in the overlapped regions of a satellite constellation having a plurality of overlapping orbital planes. The overlapped regions are created by the intersection of orbital planes having satellites traveling in one direction with orbital planes having satellites traveling in a similar or in the opposite direction. One orbital plane is designated as the master plane and within the overlapped region, the satellites in the master plane are dynamically switched to non-overlapped satellites in the intersecting planes across a seam created by the intersection of the master plane with the intersecting planes.

14 Claims, 7 Drawing Sheets

MANAGING INTER-SATELLITE CONNECTIONS IN A CONSTELLATION WITH OVERLAPPING ORBITAL PLANES

BACKGROUND OF THE INVENTION

The present invention is directed toward the field of satellite constellations. In particular, a novel inter-satellite communication method for connecting satellites is described for use with satellite constellations having overlapping orbital planes.

In the past, satellites have generally been placed in a geo-stationary orbit 22,300 miles above the Earth. Each geo-stationary satellite operated as an independent entity with user communications, data, telemetry, etc. flowing from an Earth station to the satellite and then back to the ground from the same stationary satellite. These types of satellites were fixed with respect to a particular field-of-view of the Earth, and because the satellite was located at a great distance from the Earth, it could "see" a substantial portion of the planet, such as the entire North American continent. Thus, only a few spacecraft were required for global coverage. In some satellite systems, several satellites parked in a geo-stationary orbit could also communicate with each other via an inter-satellite link ("ISL").

Although providing the advantage of being able to see a large portion of the Earth, these geo-stationary satellites and systems suffered from many disadvantages, particularly with respect to real-time communication systems, such as telephone calls, video conferencing, and real-time data transmission, including: (1) the cost to launch the relatively large satellites into the geostationary orbit was high; (2) if one satellite failed, the entire system was largely nonoperative; and (3) the time delay associated with transmission up and down from Earth to the satellite and then back was not appropriate for some types of applications.

More recently, larger constellations of non-stationary satellites have been proposed, and to date, one commercial system, Iridium, is in the process of being launched and operated. Common features of existing and planned satellite constellations include: (a) the spacecraft continually move with respect to the earth; (b) the spacecraft are positioned at a much lower altitude than the geo-stationary systems, typically located in low-earth orbit (LEO) or medium-earth orbit (MEO); (c) a plurality of orbital planes are provided, wherein an orbital plane is a set of satellites that each follow (nominally) the same orbital track or path over the Earth; and (d) user communications flow between the satellites, both within a particular plane, and between adjacent planes, using ISLs, thus forming a network in space.

The plurality of orbital planes are generally not stationary with respect to the Earth, and generally have orbital tracks that intersect with each other as they pass over the Earth. In regions where inter-satellite connections are required between spacecraft in planes moving in similar directions, inter-satellite links can be formed and held for significant periods of time since link distances and angular relationships will change slowly. Such connections are easy to manage.

However, as satellite constellations increase in size (number of satellites and planes) and complexity, the use of more complex orbital schemes will become more prevalent, such as the use of inclined orbit planes. The use of such orbits can result in regions where satellite tracks of different planes cross over each other, i.e. the orbits overlap. If the overlap occurs in regions where it is necessary to maintain the inter-satellite links, the management of inter-satellite links and the complexity of ISL terminals will be driven by the system and method for making the connections in such regions. In some situations the inter-satellite links between overlapping planes must be made and broken multiple times as linked satellites move out of the range or angular coverage capability of the ISL terminals on board each satellite.

Additionally, arrangements of orbit planes which are not stationary with respect to the Earth can create regions where satellites in certain planes are moving generally in one direction, such as towards the Southern Pole, whereas satellites in other planes are generally moving in the opposite direction. In these situations the inter-satellite links between opposing direction planes must be made and broken many times as linked satellites move out of the range of the ISL terminals on board each satellite.

In a system where dynamically changing inter-satellite connectivity is required during part of an orbit to maintain network inter-connectivity, for example between spacecraft planes moving in opposing directions, the changing connectivity region is referred to as a "seam." The problems imposed by such a region are particularly difficult to manage when both overlapping and opposing directions occur simultaneously in a large constellation of satellites, resulting in a situation where satellites are moving at different speeds relative to each other and are required to link to a plurality of other satellites simultaneously in order to form the network in space. Prior systems fail to solve the problem of how to maintain connectivity of the network in these regions.

Therefore, there remains a need in this art for a system and method of managing the inter-satellite connections between satellites in a constellation having a plurality of overlapping planes and requiring inter-satellite links in the overlap region.

There remains a further need for such a system and method of managing the inter-satellite connections between satellites with overlapping planes where satellites are moving in opposing directions.

There remains an additional need for such a system and method which limits the cost and complexity of the ISL terminals on board each satellite, minimizes the number of links that are dynamically made and broken as satellites travel about the orbital planes, minimizes the travel path (and therefore the system delay) of data flowing through the regions of the network where the orbital planes are overlapped and also minimizes the variation in delay between traffic flowing in overlapped and traffic flowing in non-overlapped regions of the network.

SUMMARY OF THE INVENTION

The present invention overcomes the problems noted above and satisfies the needs in this field for a system and method of managing the inter-connectivity of a plurality of satellites in a constellation having a plurality of overlapping orbital planes. The present invention can be used with any satellite constellation that includes satellites organized into a plurality of orbital planes, although the invention finds particularly use with constellations of LEO satellites that employ multiple inter-satellite links so that each satellite can connect to a plurality of other satellites in the same plane and in adjacent planes.

The method of the present invention manages the inter-satellite connections in a constellation of satellites having overlapping orbital planes, wherein each satellite includes a plurality of inter-satellite links for connecting to other satellites in the same plane and in adjacent planes, the method including the steps of: (1) designating at least one orbital plane as the master plane; and then (2) dynamically switching the satellites in the master plane to satellites in planes that intersect the master plane across the boundary created by the intersection of the master plane with the intersecting planes. The dynamic switching of the satellites in the master plane to those of the intersecting planes occurs at the boundary of the overlap region and is equally applicable whether the satellites in the intersecting plane are traveling in a direction similar to the master plane, or in an opposing direction to the master plane. It is at these overlapped regions that the connection method of the present invention is particularly advantageous over alternative techniques for completing the space network.

As the satellites in the master plane approach an overlapped region, they are first connected to non-overlapped satellites in the first plane that intersects with the orbital track of the master plane. A non-overlapped satellite is one that has already or is about to cross over the boundary created by the intersection of the master plane with the intersecting planes. As the satellites in the master plane move away from those in the first intersecting plane, they are dynamically switched to other non-overlapped satellites in other intersecting planes. This process of dynamically switching the satellites of the master plane to subsequent intersecting planes continues until the satellites of the master plane reach a particular latitude where the connection between overlapping planes is no longer maintained. The timing of the switching process is highly predictable, lending itself to calculation and control using simple computation. The process is preferably managed autonomously by the on-board computers in the satellites using orbital data derived from command and control computers at Earth ground stations that track the satellite orbits, but the process could, alternatively, be managed and controlled directly by ground stations. The process will be linked with the computers that manage the network traffic routing in the system.

A satellite constellation according to the present invention includes a plurality of satellites having multiple inter-satellite links for making connections to other satellites, the satellites being organized into a plurality of overlapping orbital planes that form overlapped and non-overlapped regions. In the preferred embodiment of the present invention, one of the orbital planes is designated as a master plane for completing the connectivity of the network constellation by dynamically switching the inter-satellite links of the satellites in the master plane to satellites in intersecting planes at the boundaries of the overlapped regions. Alternatively, and depending upon the number and characteristics of the satellites and the orbital planes in which they are located, more than one plane could possibly be designated as the master plane for certain periods of time.

The primary advantage of the present invention is that it provides a solution for the problem of how to complete the network connection in a satellite constellation having multiple, overlapping orbital planes. Other advantages of the present invention include: (1) the link distances at the connection seam are within the same limits as in the non-overlapped regions, thereby reducing the cost and complexity of the ISL terminals; (2) data traffic routes through the shortest communication distance within the overlap region, thereby minimizing network communication delay and delay variation; and (3) connections at the seam are established from the same side of the satellite as in the non-overlapping regions, thereby reducing the cost and complexity of the satellite.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
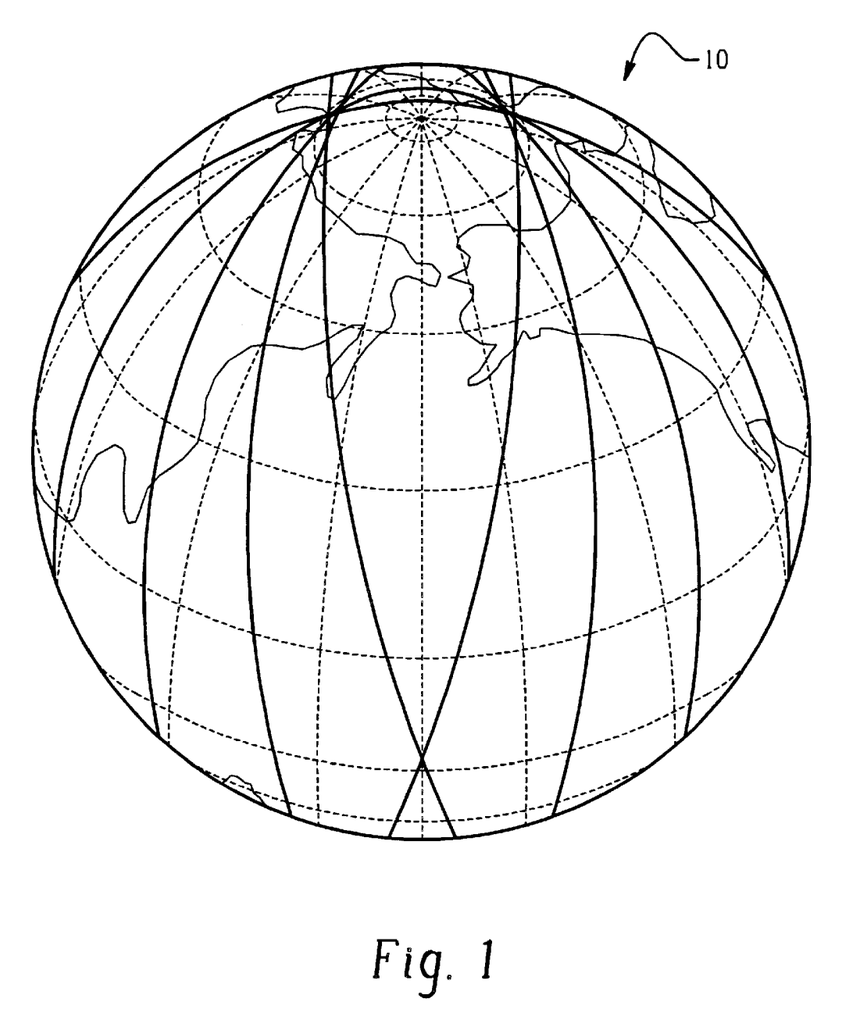
FIG. 1 is a perspective view from space of a satellite constellation having overlapping orbital planes.
Figure 2:
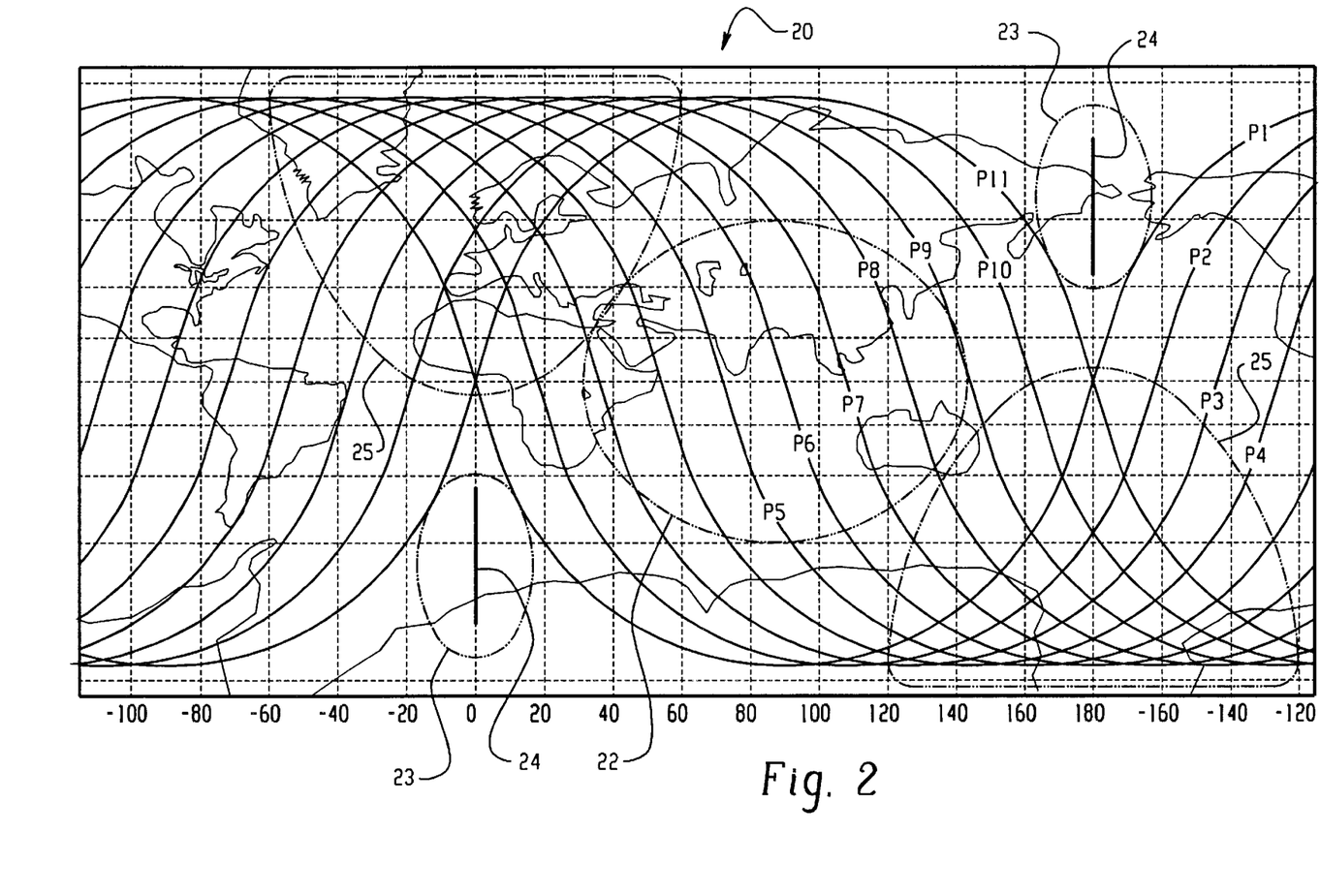
FIG. 2 is a Mercator Projection of the same satellite constellation demonstrating the non-overlapped and overlapped regions created by the overlapping orbital planes of an exemplary constellation having eleven planes.

Referring now to the drawings, FIGS. 1 and 2 set forth, respectively, a perspective view 10 and a Mercator Projection 20 of an exemplary satellite constellation 10 as viewed from space. In this example constellation there are eleven orbital planes, with twenty satellites per plane. An orbital plane is a two dimensional disk that intersects with the Earth, the exterior of the plane being traced out by the flight path of the satellites that travel in that plane. The orbital track of a particular plane is the path over the Earth's surface that the satellites pass over. Although the present invention is described with respect to the example constellation of eleven orbital planes, each plane having twenty satellites, the invention is not limited to any particular number of satellites or planes, but can be used with any constellation where the orbital planes overlap to create seams that must be connected so that network traffic can freely flow from east to west and vice versa.

In the example constellation of FIGS. 1 and 2, the satellites are in a sun-synchronous LEO orbit, and each orbital plane is inclined from the equatorial plane (FIG. 1 shows the inclination of each orbital plane.) In addition to these orbital characteristics, each of the twenty satellites in each of the eleven orbital planes includes six inter-satellite links, which may be laser ISLs, radio frequency ISLs, or any other type of communication link. The purpose of the ISLs is to connect a given satellite with up to six of its neighbors, either in the same plane or in adjacent planes, in order to form a communication network in orbit. The invention is not limited to any specific number of ISLs per satellite, nor to the number of connections.

FIG. 2 shows the orbital tracks formed by the orbital planes of the exemplary system. There are eleven orbital planes shown in FIG. 2, labeled P1 through P11. Since the orbits are LEO the planes will not be stationary with respect to the Earth but on each rotation around the Earth a satellite will cross the Equator at a different longitude than the previous rotation. FIGS. 1 and 2 therefore show the relationships over a small time duration. Within each plane, the satellites move around a plane from east to west so that, considering plane 1, labeled P1, at the time shown in FIG. 2 for example, a satellite over Alaska descends towards the South Pole, crossing over Antarctica, then ascends towards the North Pole, crossing over Western Africa, and then crosses over the Arctic north of Canada before commencing to descend again.

As seen in this figure, there are three types of regions that are formed by the plurality of overlapping orbital planes. The first type of region is a non-overlapped region 22, in which each of the satellites over an area of the Earth bounded by certain latitudes are traveling in the same general direction (Lie., either ascending or descending). An example of such a non-overlapped region is 0° latitude, 100° longitude on FIG. 2. In the non-overlapped regions, it is relatively straightforward to manage the ISL connectivity between satellites since each satellite is traveling at about the same velocity and in the same general direction. The ISLs for a particular satellite are simply connected to satellites in the same plane, and in the nearest two adjacent planes. Thus communication traffic from a satellite in plane 5 to plane 8 crosses the region 22 via planes 6 and 7 in that order.

The second type of region shown on FIG. 2 is an orbit created seam region 23 where satellites in certain planes are traveling in one direction (i.e. ascending) while satellites in other planes are traveling in the opposite direction (i.e. descending). An example of such a region is around 60° S latitude, 0° longitude. In this area planes at higher longitude are descending while those at lower (negative) longitude are ascending. The seam as represented by line 24 on FIG. 2 represents the line across which the dynamic interconnections are required between the ascending and descending planes. West to east communication traffic crosses this seam from plane 11 to plane 1 and similarly east to west traffic from plane 1 to plane 11.

The third type of region shown on FIG. 2 is an overlap region 25 in which orbit tracks overlap and additionally satellites in certain planes are traveling in one direction (i.e. ascending) while satellites in other planes are traveling in the opposite direction (i.e. descending). An example of such a region is around 60° S latitude, 180° longitude. In this area, if the network is required to be connected above 70° S latitude, connections are required so that traffic can flow from between the regions east and west of the region. For example, referring to FIG. 2, traffic moving from 70° S latitude, 120° longitude and going to 70° S latitude, −120° longitude must cross the overlap region 25. Making and managing inter-satellite communications between spacecraft in this region 25 is necessary to complete the satellite network.

Figure 3:
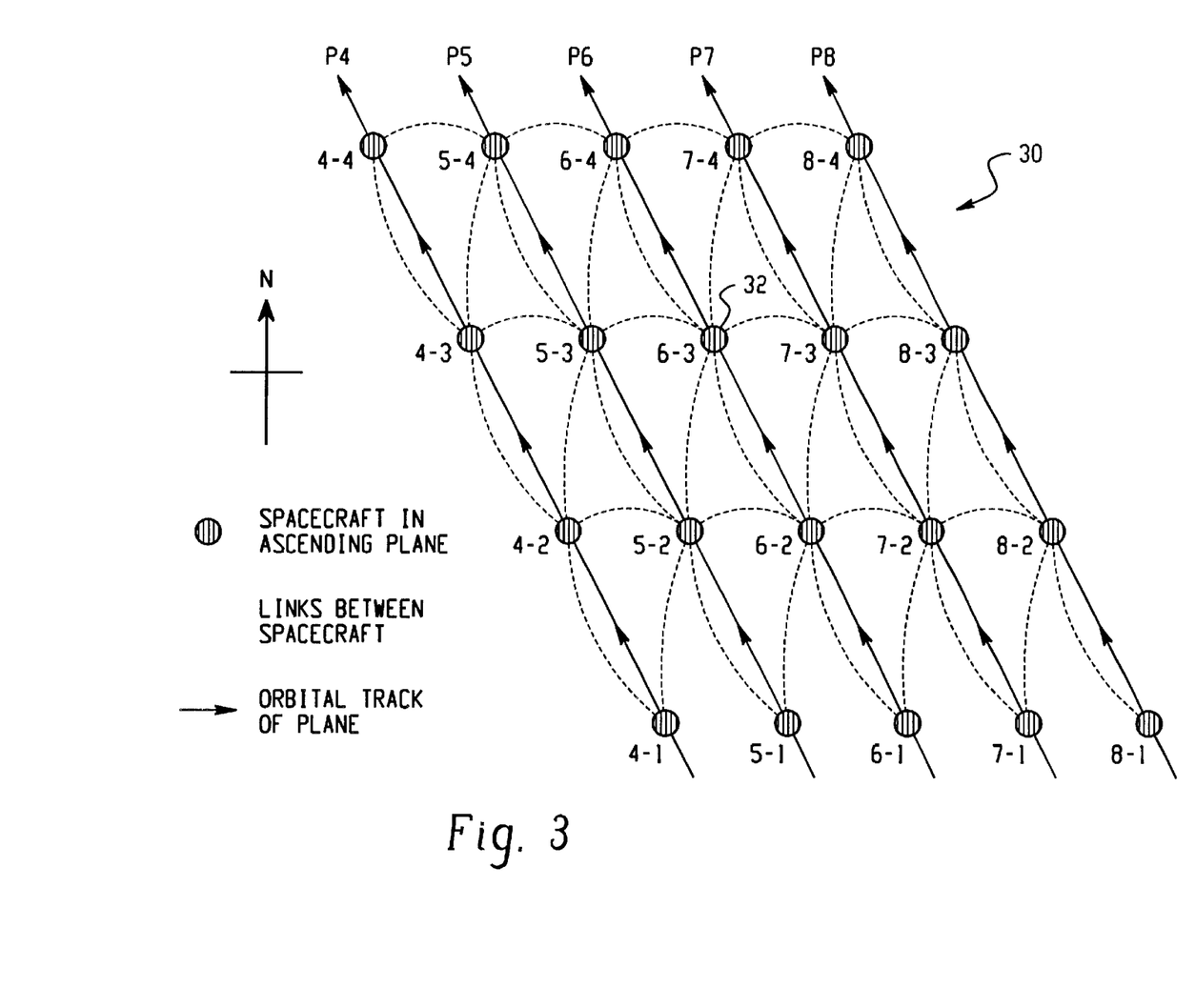
FIG. 3 is a diagram of the inter-satellite connectivity in a region where the planes are non-overlapped.

FIG. 3 is a diagram of the inter-satellite connectivity in a region where the planes are non-overlapped, such as region 22 in FIG. 2. Each circle on this diagram represents a satellite having six ISL terminals, as well as all of the other communication, antenna, propulsion and bus systems typically associated with such satellites. There are five orbital planes shown, labeled P4-P8, and four satellites in each plane are shown for purposes of demonstrating the connectivity in the non-overlapped region. The satellites are labeled "x-y", where "x" is the orbital plane that the satellite is part of, and "y" is the satellite number (1-20 in the example constellation). Consider satellite 32, which is labeled 6-3. This satellite is the third satellite in plane 6, and it is connected to satellite 6-2 and 6-4 in its own orbital plane, and it is also connected to satellites 5-3, 5-4, 7-2 and 7-3 in adjacent orbital planes. Because the satellites in the non-overlapped regions are all traveling in generally the same direction, it is straightforward to manage the ISL connections in these regions.

Figure 4:
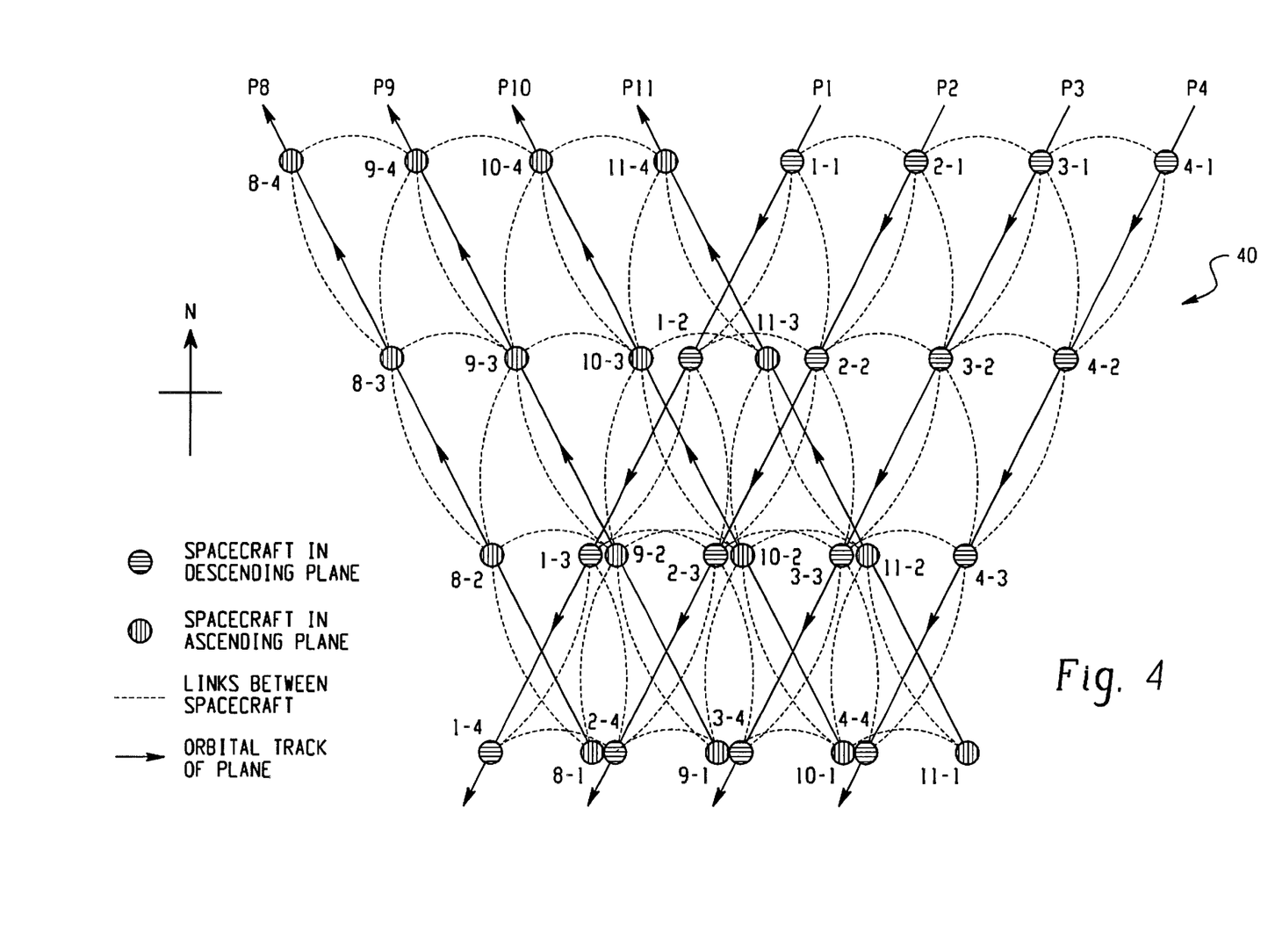
FIG. 4 is a diagram of the inter-satellite connectivity in a region where the planes are overlapped.

FIG. 4 is a diagram 40 of the inter-satellite connectivity in a region where the planes are overlapped, such as region 25 in FIG. 2. As described in more detail below, the present invention provides an optimal method and system of connecting satellites in these overlapped regions. In this figure, satellites in planes 1, 2, 3 and 4 (darker circles) are descending toward the South Pole, while the satellites in planes 8, 9, 10 and 11 (lighter circles) are ascending away from the pole. As in FIG. 3, the satellites are numbered using the "plane-satellite" nomenclature.

It can be seen in this diagram that satellites 1-1, 1-2, 1-3,1-4, 11-1, 11-2, 11-3 and 11-4 are the only satellites with unconnected ISLs. Each of the other satellites is connected to six same-plane and adjacent-plane satellites that are traveling in the same general direction, as described in FIG. 3. As noted above, the intersection of a plane having satellites traveling in one direction, such as plane 1, with planes that have satellites traveling in a generally opposite direction, such as planes 9, 10 and 11, creates an orbital "seam" region. In order to complete the network so that data can flow freely from east to west, a system and method are required for dynamically connecting the satellites across this region to form the seam.

Figure 5:
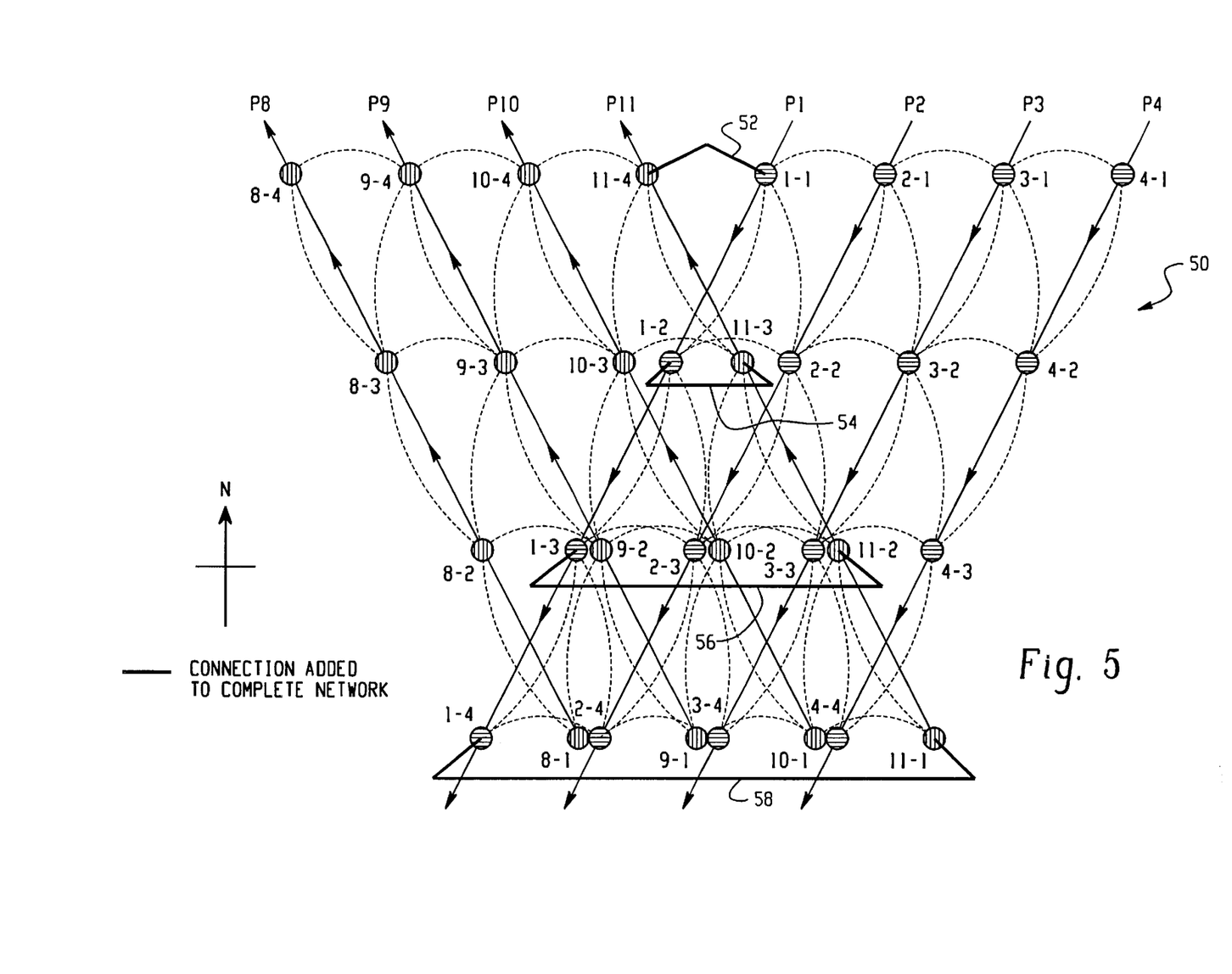
FIG. 5 is a diagram of a non-optimal method for completing the inter-satellite connectivity of the constellation using a forced plane approach.

FIG. 5 is a diagram 50 of a non-optimal method for completing the inter-satellite connectivity of the constellation using a forced plane approach. According to this approach, an ISL terminal of a satellite in plane 1 is forced to connect to an ISL terminal of a satellite in plane 11. At the time instant shown in FIG. 5, satellite 1-1 is connected to satellite 11-4 via link 52, satellite 1-2 is connected to satellite 11-3 via link 54, satellite 1-3 is connected to satellite 11-2 via link 56, and satellite 1-4 is connected to satellite 11-1 via link 58. Likewise, other satellites in plane 1 would be forced to connect to satellites in plane 11. This connectivity results in long links, for example bridging 4 orbit planes as shown for link 58.

A number of problems exist with this type of approach to managing the overlap interconnections. First, as the orbital planes cross, the ISL terminals on the opposite side to the required communication direction must be utilized to make the connection, unless outages are allowed to occur on other links. This creates field-of-view complexities both for the ISL terminals, and for the satellite bus configuration which are costly and may be impossible to physically realize. Second, as the orbital track overlap distance increases, the range between the inter-connecting satellites increases beyond the normal design range of the ISL terminals required in non-overlapped regions where the satellites are communicating to same-plane or adjacent-plane satellites at a particular distance. Third, in order to connect over the region created as plane 1 intersects with planes 11, 10, 9 and 8, the communication delay can become excessive.

For example, consider the routing of traffic between satellite 8-2 and 4-3 in FIG. 5. The routing path is 8-2, 9-2, 10-2, 11-2, 1-3, 2-3, 3-3, 4-3, or vice versa, depending on the direction of traffic flow. Seven links are required to make a connection between satellites that are physically only three links apart in the non-overlapping region. Such a variation in delay between the non-overlapping and overlapping regions imposes data buffering penalties on the user terminals in order to provide high quality of service for data and voice communications.

And fourth, communication control between user (ground) terminals is complicated by making a connection to a satellite that is physically very close to another satellite providing overlapping coverage of the same area of the Earth, such as satellites 3-3 and 11-2. The close range of these two satellites requires user terminals having increased discrimination and sensitivity so that the correct satellite is selected by the terminal uplink and downlink.

Figure 6:
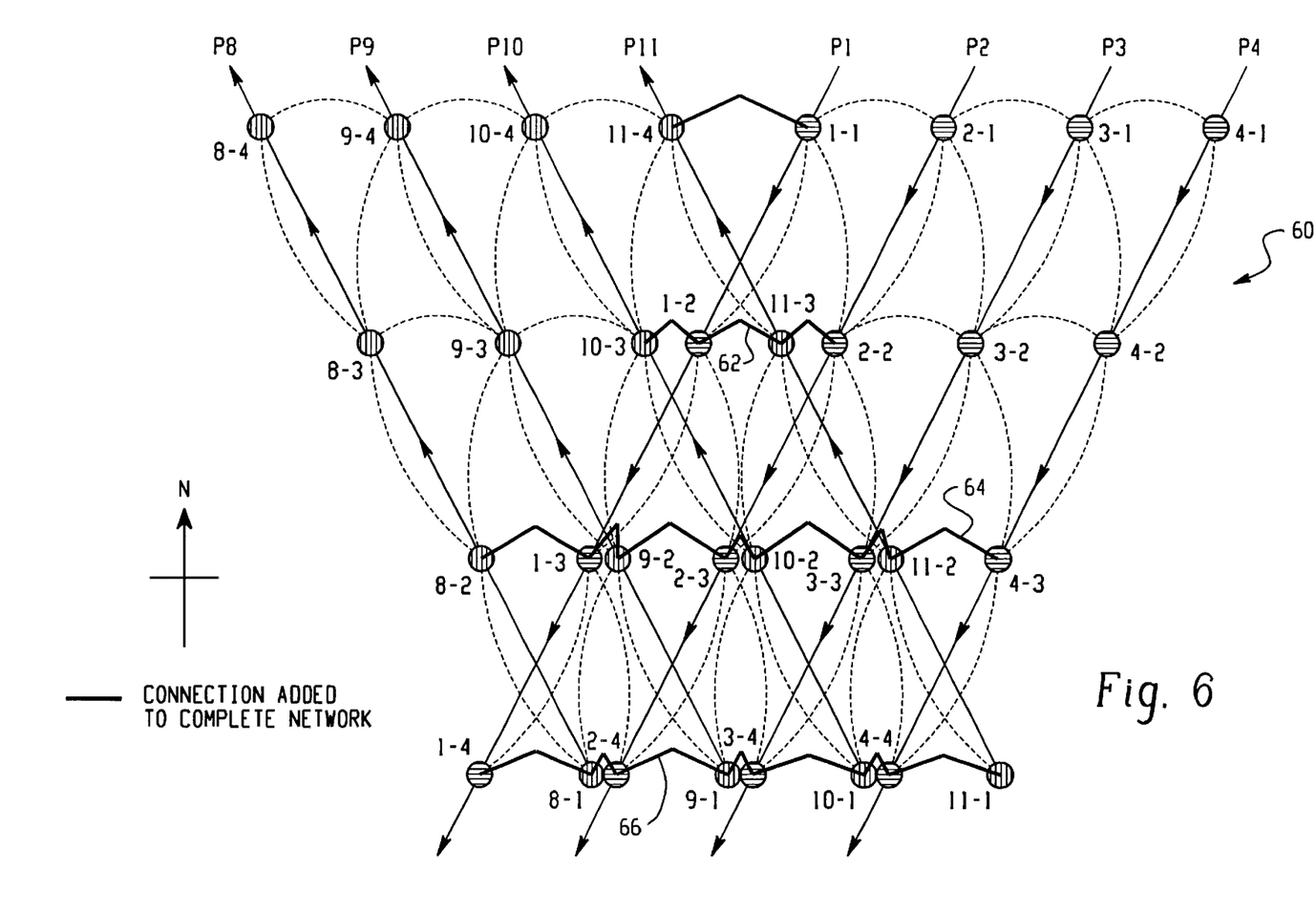
FIG. 6 is a diagram of another non-optimal method for completing the inter-satellite connectivity of the constellation using a nearest neighbor approach.

FIG. 6 is a diagram 60 of an alternative, but still non-optimal method for completing the inter-satellite connectivity of the constellation in the overlapped regions using a nearest neighbor approach and dynamically changing connectivity in the overlap region. Using this approach, inter-satellite communications are established across the region created by the intersecting path of planes 1–4 with planes 8–11 by connecting each satellite to its nearest neighbor within the overlapped region.

Connection 62 is formed by connecting satellites 10-3 to 1-2, 1-2 to 11-3 and 11-3 to 2-2. This connection 62 creates a path that crosses the region created by the intersection of planes 1 and 2 with planes 10 and 11. Connection 64 creates a path that crosses the region created by the intersection of planes 1, 2 and 3 with planes 9, 10 and 11, and connection 66 creates a path that crosses the region created by the intersection of planes 1–4 with planes 8–11. Although not shown in FIG. 6, this approach would likewise create additional connections to create paths across additional intersecting regions depending upon the number of overlapping orbital tracks.

This approach resolves, in part, the first two problems noted above with the forced connection approach, but still suffers from the third and fourth problems, excessive communication delay and user terminal discrimination for adjacent satellites. In addition, this approach requires that a large number of ISL links are established and broken as the satellites traveling in one direction pass out of range and try to create new links to the satellites traveling in the opposite direction.

Figure 7:
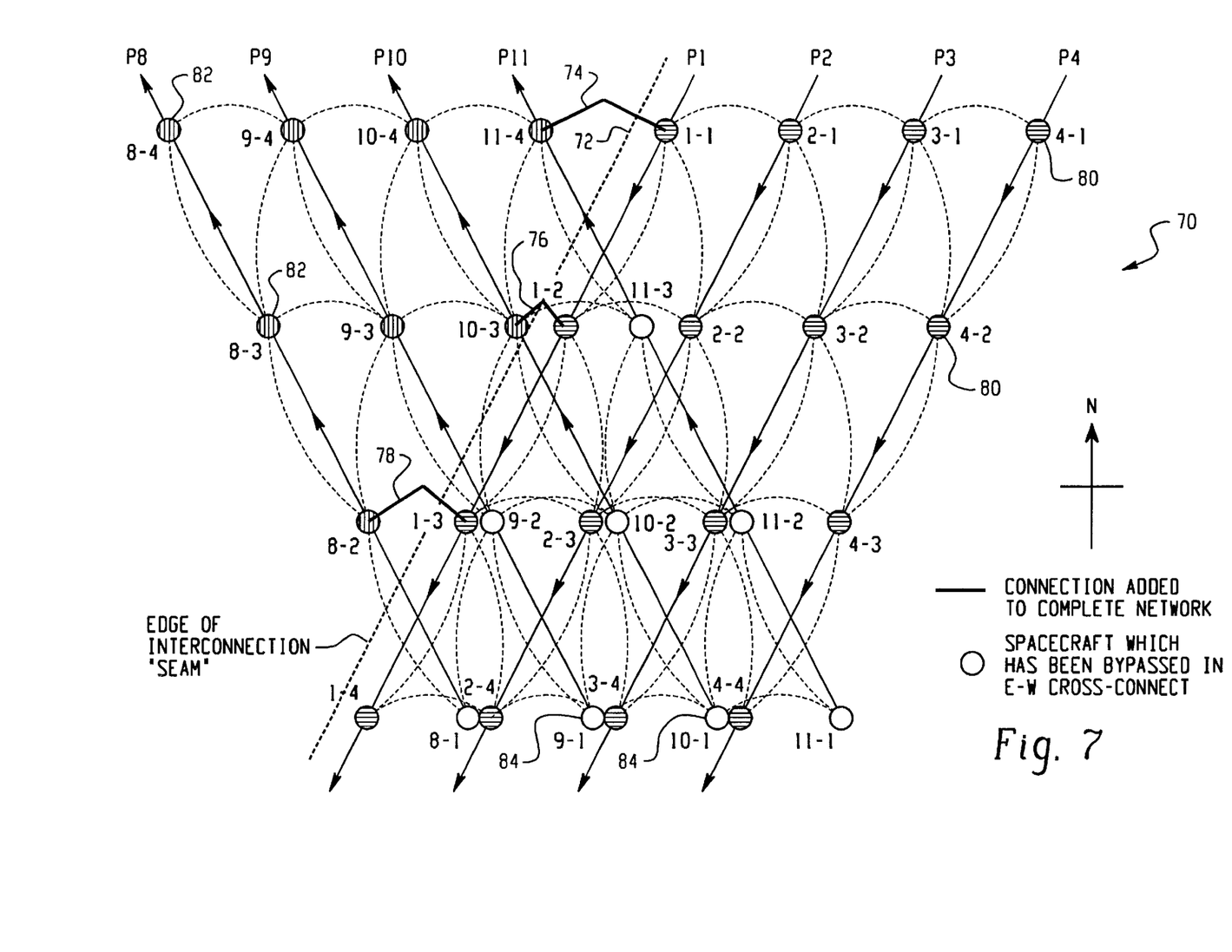
FIG. 7 is a diagram of an optimal method and system for completing the inter-satellite connectivity of the constellation using the approach of the present invention.

Turning now to FIG. 7, a diagram 70 of an optimal method and system for completing the inter-satellite connectivity in the overlapped regions of a satellite constellation network is set forth utilizing the preferred approach of the present invention. As in the previous figures, the satellites in planes 1, 2, 3 and 4 (darker circles) 80 are descending toward the South Pole, while the satellites in planes 8, 9, 10 and 11 (lighter circles) 82 are ascending from the pole, creating the overlapped region 25 similar to that shown in FIG. 2. Satellites in planes 8–11 which lie in the overlap region are shown as empty circles (no shading) 84. These satellites are deemed "overlapped" and are to treated as a special case as described later.

According to the connectivity management approach shown in FIG. 7, at least one orbital plane is designated as the "master" plane that will complete the network connection across at least one seam. In the example of FIG. 7, plane 1 is designated as the master plane, and the seam 72 created by the intersection of plane 1 with the orbital planes having satellites traveling in the opposite direction to those satellites in plane 1 (intersected planes) is the boundary across which the network-completing connections are made.

The satellites in the intersected planes that are overlapped 84 and that have not yet crossed the seam 72 created by the master plane 1 are not used for connecting the network in the east-west direction. Satellites 11-3, 9-2, 10-2, 11-2, 8-1, 9-1, 10-1 and 11-1 in FIG. 7 are not connected to satellites in planes 1–4 and therefore are not used to complete the network east-west connections.

Instead, network east-west connections are made from the edge of the master plane 1 to the nearest non-overlapped satellite in one of the intersected planes to form the completed network. Satellite 1-1 is connected to 11-4 via connection 74, satellite 1-2 is connected to satellite 10-3 via connection 76, and satellite 1-3 is connected to satellite 8-2 via connection 78. Although not shown in FIG. 7, other satellites in the master plane would likewise be connected to satellites in the intersected planes that are not overlapped by the seam created by the track of the master plane.

As the satellites in the master plane descend towards the South Pole, the links shown in FIG. 7 are broken (as the satellites move out of range of one another) and new links are dynamically created to the nearest non-overlapped satellite on the next intersected plane. Consider satellite 1-1, for example. As shown in FIG. 7, as satellite 1-1 approaches the overlapped region, it is first connected to its nearest non-overlapped neighbor traveling in the opposite direction, satellite 11-4. After a certain period of time has elapsed, satellite 1-1 will travel to the position previously occupied by satellite 1-2, satellite 11-4 will ascend upwards, becoming out of range, and satellite 10-2 will ascend to the position previously occupied by satellite 10-3. Satellite 10-2 will become non-overlapped, crossing the orbit track created by the master plane, and the computers that command and control the switching of one satellite to another will send commands to the ISLs of satellite 1-1 and satellite 10-2 to link up. As time continues to progress, satellite 1-1 will likewise switch to a non-overlapped satellite in plane 9, plane 8, plane 7, and so forth, until the satellite 1-1 is so far south that it is not practical nor desirable to attempt to maintain east-west connectivity from this satellite.

Turning back to FIG. 2, as the satellites in the master plane 1 descend to about 72° S latitude, the network will cease attempting to link the satellites to a non-overlapped satellite traveling in the opposite direction. These satellites then travel over Antarctica and begin to ascend towards West Africa. At approximately 0° latitude, 0° longitude, the satellites in the master plane 1 will intersect with satellites traveling in the opposite direction in plane 11. In the same manner as described above, the satellites in the master plane will link with non-overlapped satellites in planes 11, 10, 9, 8 and so forth to complete the network connectivity. As these satellites continue to ascend towards the North Pole, at some point the network will cease attempting to hold the inter-satellite connections, and the entire process will begin again as the satellites in the master plane descend from the North Pole and again approach the intersection with plane 11.

The actual mechanism or means for dynamically making and breaking the ISL connections as the satellites traverse the orbital planes through the overlapped and non-overlapped region is a combination of the command and control network, and the satellites being connected. The command and control network (not shown) preferably maintains a time-management program that tracks the precise location of each satellite in the constellation as the satellites move throughout the network. Knowing the position, velocity, altitude and other parameters of each satellite, the timing and sequencing of the ISL connection changes needed to form the seam can be deterministically calculated in advance, before affected spacecraft enter the seam region to make and break ISL connections in order to manage the traffic flow as depicted in FIG. 7. Thus the designation of one orbital plane as the master plane and the subsequent information necessary to dynamically make and break the links according to FIG. 7 can be pre-programmed into the spacecraft computers and into the computers controlling the communication network traffic routing.

The approach described in FIG. 7 for completing the network constellation provides many advantages over other connection management schemes: (1) the number of links broken and created is minimized; (2) satellites that are overlapped are unnecessary for providing ground coverage, which simplifies network management and user (ground) terminal discrimination of satellites; (3) ISL terminal link distances are maintained at about the same distances as in the non-overlapped regions, thereby minimizing cost and complexity of the ISL terminals; (4) east-west traffic routes through the shortest communication distance in the overlapped region, thus minimizing network delay (for example, the connection between satellites 8-2 and 4-3 described in FIG. 3 that required 7 links requires only 4 links in the configuration shown in FIG. 7) and hence minimizing delay variation between overlap and non-overlap regions of the network, thereby reducing buffering requirements in user (ground) terminals; and (5) the connections across the seam to complete the network are made from the same side of the satellites in the master and intersecting planes as used in the nonoverlap regions, also reducing the cost and complexity of the ISL terminals.

Having described in detail the preferred embodiment of the present invention, including the preferred method of operation, it is to be understood that this operation could be carried out with different elements and steps. This preferred embodiment is presented only by way of example and is not meant to limit the scope of the present invention which is defined by the following claims.

What is claimed:

1. A method of managing inter-satellite connections in a constellation of satellites having overlapping orbital planes, each orbital plane including a plurality of satellites, and each satellite having a plurality of inter-satellite links for connecting to other satellites, the method comprising the steps of:
   (a) designating at least one orbital plane as the master plane; and
   (b) at regions where the orbital planes overlap, dynamically switching the satellites in the master plane to satellites in intersecting orbital planes across a boundary created by the intersection of the master plane with the intersecting orbital planes by
      (b) (1) for each satellite in the master plane, making a first connection to a non-overlapped satellite in a first intersecting plane;
      (b) (2) after a certain period of time, breaking the first connection to the non-overlapped satellite in the first intersecting plane; and
      (b) (3) making a second connection to a non-overlapped satellite in a second intersecting plane.

2. The method of claim 1, wherein the constellation includes a plurality of intersecting planes to the master plane, and wherein the steps of breaking a connection to a satellite in one intersecting plane and subsequently making a connection to a satellite in another intersecting plane are repeated until the satellites in the master plane reach a particular orbital latitude.

3. The method of claim 1, wherein the designating and dynamically switching steps are pre-programmed into a network that commands and controls the inter-satellite connections by transmitting directions to make and break connections in the satellite constellation.

4. The method of claim 1, wherein the designating and dynamically switching steps are managed by one or more computers on-board each satellite.

5. The method of claim 1, wherein the inter-satellite links are optical terminals.

6. The method of claim 1, wherein the inter-satellite links are radio-frequency terminals.

7. A method of managing inter-satellite connections in a constellation of satellites having overlapping orbital planes, each orbital plane including a plurality of satellites, and each satellite having a plurality of inter-satellite links for connecting to other satellites, the method comprising the steps of:
   (a) designating at least one orbital plane as the master plane; and
   (b) at regions where the orbital planes overlap, dynamically switching the satellites in the master plane to satellites in intersecting orbital planes across a boundary created by the intersection of the master plane with the intersecting orbital planes, wherein satellites in the intersecting planes that are overlapped by satellites in the master plane are only connected to satellites traveling in the same direction.

8. A method of managing inter-satellite connections in a constellation of satellites having overlapping orbital planes, each orbital plane including a plurality of satellites, and each satellite having a plurality of inter-satellite links for connecting to other satellites, the method comprising the steps of:
   (a) designating at least one orbital plane as the master plane; and
   (b) at regions where the orbital planes overlap, dynamically switching the satellites in the master plane to satellites in intersecting orbital planes across a boundary created by the intersection of the master plane with the intersecting orbital planes, wherein the dynamically switching step includes the steps of: connecting the satellites in the master plane across the boundary to non-overlapped satellites in the intersecting planes, and dynamically switching the satellites in the master plane to other non-overlapped satellites in the intersecting planes.

9. The method of claim 8, wherein each satellite in the master plane is first connected to a non-overlapped satellite in a first intersecting plane, and as the connected satellites move out of range, the satellite in the master plane is then connected to a non-overlapped satellite in a second intersecting plane.

10. The method of claim 9, wherein each satellite in the master plane is subsequently connected to non-overlapped satellites in additional intersecting planes until the satellites in the master plane reach an orbital latitude where the connections across the boundary are no longer established.

11. The method of claim 10, wherein the satellites of the master plane subsequently reach an orbital latitude where the connections across the boundary are reestablished.

12. A satellite constellation comprising:
   a plurality of satellites, each satellite having a plurality of inter-satellite links for making connections to other satellites wherein the plurality of satellites are organized into a plurality of overlapping orbital planes;
   wherein at least one orbital plane is designated as the master plane, and the inter-satellite links of the satellites in the master plane are dynamically switched to satellites in intersecting orbital planes in regions where the orbital planes overlap; and on-board computer systems on each satellite that manage the dynamic switching of satellites between planes using orbital data derived from command and control computers at Earth ground stations that track the satellite orbits.

13. The satellite constellation of claim 12, wherein the inter-satellite links are optical terminals.

14. A system for managing inter-satellite connections in a constellation of satellites having overlapping orbital planes, each orbital plane including a plurality of satellites, and each satellite having a plurality of inter-satellite links for connecting to other satellites, the system comprising:

(a) means for designating at least one orbital plane as the master plane; and (b) means for dynamically switching the satellites in the master plane to non-overlapped satellites in intersecting planes across a seam created by the intersection of the master plane with the intersecting planes.

* * * * *